(12) United States Patent
Song

(10) Patent No.: US 11,675,507 B2
(45) Date of Patent: *Jun. 13, 2023

(54) METHOD AND APPARATUS FOR ALLOCATING MEMORY SPACE FOR DRIVING NEURAL NETWORK

(71) Applicant: Samsung Electronics Co., Ltd., Suwon-si (KR)

(72) Inventor: Joonho Song, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,447

(22) Filed: Aug. 5, 2021

(65) Prior Publication Data
US 2021/0365194 A1 Nov. 25, 2021

Related U.S. Application Data

(63) Continuation of application No. 16/561,303, filed on Sep. 5, 2019, now Pat. No. 11,112,980.

(30) Foreign Application Priority Data

Dec. 4, 2018 (KR) .................. 10-2018-0154692

(51) Int. Cl.
*G06F 3/06* (2006.01)
*G06N 3/04* (2023.01)

(52) U.S. Cl.
CPC .......... *G06F 3/0631* (2013.01); *G06F 3/0604* (2013.01); *G06F 3/0673* (2013.01); *G06N 3/04* (2013.01)

(58) Field of Classification Search
CPC .... G06F 12/023; G06F 3/0631; G06F 3/0604; G06F 3/0673; G06N 3/04; G06N 3/063; G06N 5/046
See application file for complete search history.

(56) References Cited

U.S. PATENT DOCUMENTS

| | | | |
|---|---|---|---|
| 9,971,540 B2 | 5/2018 | Herrero Abellanas et al. | |
| 10,417,555 B2 | 9/2019 | Brothers et al. | |
| 2016/0092363 A1 | 3/2016 | Wang et al. | |
| 2016/0188491 A1 | 6/2016 | Apodaca | |
| 2016/0342888 A1 | 11/2016 | Yang et al. | |
| 2016/0350645 A1 | 12/2016 | Brothers et al. | |
| 2016/0364644 A1* | 12/2016 | Brothers | G06N 3/049 |

(Continued)

FOREIGN PATENT DOCUMENTS

KR 10-2016-0140394 A 12/2016
KR 10-2017-0099848 A 9/2017

*Primary Examiner* — Hiep T Nguyen
(74) *Attorney, Agent, or Firm* — NSIP Law

(57) ABSTRACT

A method of allocating a memory for driving a neural network including obtaining first capacity information of a space to store an input feature map of a first layer from among the layers of the neural network, and second capacity information of a space to store an output feature map of the first layer, and allocating a first storage space to store the input feature map in the memory based on an initial address value of the memory and the first capacity information and a second storage space to store the output feature map in the memory based on a last address value of the memory and the second capacity information.

15 Claims, 10 Drawing Sheets

(56) References Cited

U.S. PATENT DOCUMENTS

| | | |
|---|---|---|
| 2017/0344882 A1 | 11/2017 | Ambrose et al. |
| 2018/0088996 A1 | 3/2018 | Rossi et al. |
| 2018/0253636 A1 | 9/2018 | Lee et al. |
| 2018/0336462 A1 | 11/2018 | Brothers |
| 2018/0341860 A1 | 11/2018 | Shazeer et al. |
| 2019/0187963 A1 | 6/2019 | Bokhari et al. |
| 2020/0065251 A1 | 2/2020 | Chao et al. |

\* cited by examiner

METHOD AND APPARATUS FOR ALLOCATING MEMORY SPACE FOR DRIVING NEURAL NETWORK

CROSS-REFERENCE TO RELATED APPLICATION

This application is a continuation of U.S. patent application Ser. No. 16/561,303 filed on Sep. 5, 2019 which claims the benefit under 35 USC § 119(a) of Korean Patent Application No. 10-2018-0154692, filed on Dec. 4, 2018, in the Korean Intellectual Property Office, the entire disclosure of which is incorporated herein by reference for all purposes.

BACKGROUND

1. Field

The following description relates to methods and apparatuses for allocating memory space to a of layer of a neural network for driving a neural network.

2. Description of Related Art

Neural networks are specialized computational architecture, which after substantial training may provide computationally intuitive mappings between input patterns and output patterns. Along with the development of neural network technology, various kinds of electronic systems have been developed that use a neural network to analyze input data to extract valid output data.

Apparatuses for processing a neural network require a large amount of operations regarding complex input data. For example, a neural network performs numerous operations on images and produces a large amount of intermediate resultant data. Therefore, the performance of a neural network may be degraded due to the limitations in a bandwidth of an external memory while a processor of the neural network reads or writes the large amount of intermediate result data from or to the external memory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of allocating a memory to layers of a neural network, the method including obtaining first capacity information of a space to store an input feature map of a first layer from among the layers of the neural network, and second capacity information of a space to store an output feature map of the first layer, and allocating a first storage space to store the input feature map in the memory based on an initial address value of the memory and the first capacity information and a second storage space to store the output feature map in the memory based on a last address value of the memory and the second capacity information.

The method may include allocating a space to store an input feature map of a second layer subsequent to the first layer, to the second storage space, obtaining third capacity information of a space to store an output feature map of the second layer, and allocating a third storage space to store the output feature map of the second layer in the memory based on the initial address value of the memory and the third capacity information.

The first storage space may correspond to a space from the initial address value to a first address value of the memory, and the second storage space may correspond to a space from a second address value to the last address value of the memory.

The obtaining may include obtaining fourth capacity information of a space to store a weight map for an operation with the input feature map, and the allocating may include allocating a space to store the weight map between the first storage space and the second storage space based on the fourth capacity information.

The method may include dividing a weight map of the first layer into sub-weight maps, dividing the first layer into sublayers and respectively allocating the sub-weight maps to the sublayers, obtaining sub-capacity information of spaces to respectively store the sub-weight maps, and allocating, to each of the sublayers, a space to store a sub-weight map of the sub-weight maps based on the respective sub-capacity information of the sub-weight map, between the first storage space and the second storage space.

The channels of the output feature map may be respectively generated from an operation between each of the sub-weight maps and the input feature map, and sequentially storing the channels of the output feature map in the second storage space.

The method may include selecting an input tile in the input feature map of the first layer, obtaining capacity information about a capacity to respectively store the input tile, an output tile corresponding to the input tile, and a weight map of the first layer, and allocating spaces to respectively store the input tile, the output tile, and the weight map in the memory based on the capacity information.

The memory may be located in a processor of a device driving the neural network.

In another general aspect, there is provided a neural network device including a memory, and a processor configured to drive to execute instructions to drive a neural network to obtain first capacity information of a space to store an input feature map of a first layer from among layers of the neural network, and second capacity information of a space to store an output feature map of the first layer, and allocate a first storage space to store the input feature map in the memory based on an initial address value of the memory and the first capacity information and a second storage space to store the output feature map in the memory based on a last address value of the memory and the second capacity information.

The processor may be configured to allocate a space to store an input feature map of a second layer subsequent to the first layer, to the second storage space, obtain third capacity information of a space to store an output feature map of the second layer, and allocate a third storage space to store the output feature map of the second layer in the memory based on the initial address value of the memory and the third capacity information.

The first storage space may correspond to a space from the initial address value to a first address value of the memory, and the second storage space may correspond to a space from a second address value to the last address value of the memory.

The processor may be configured to obtain fourth capacity information of a space to store a weight map for an operation with the input feature map, and allocate a space to store the weight map between the first storage space and the second storage space based on the fourth capacity information.

The processor may be configured to divide a weight map of the first layer into sub-weight maps, divide the first layer into sublayers, and respectively allocate the sub-weight maps to the sublayers, obtain sub-capacity information of spaces to respectively store the sub-weight maps, and allocate, to each of the sublayers, a space to store a sub-weight map of the sub-weight maps based on the respective sub-capacity information of the sub-weight map, between the first storage space and the second storage space.

The processor may be configured to generate channels of the output feature map from an operation between each of the sub-weight maps and the input feature map, and sequentially store each of the channels of the output feature map.

The processor may be configured to select an input tile in the input feature map of the first layer, obtain capacity information about a capacity to respectively store the input tile, an output tile corresponding to the input tile, and the weight map of the first layer, and allocate spaces to respectively store the input tile, the output tile, and the weight map in the memory based on the capacity information.

The memory is located in the processor.

Other features and aspects will be apparent from the following detailed description, the drawings, and the claims.

Figure 1:
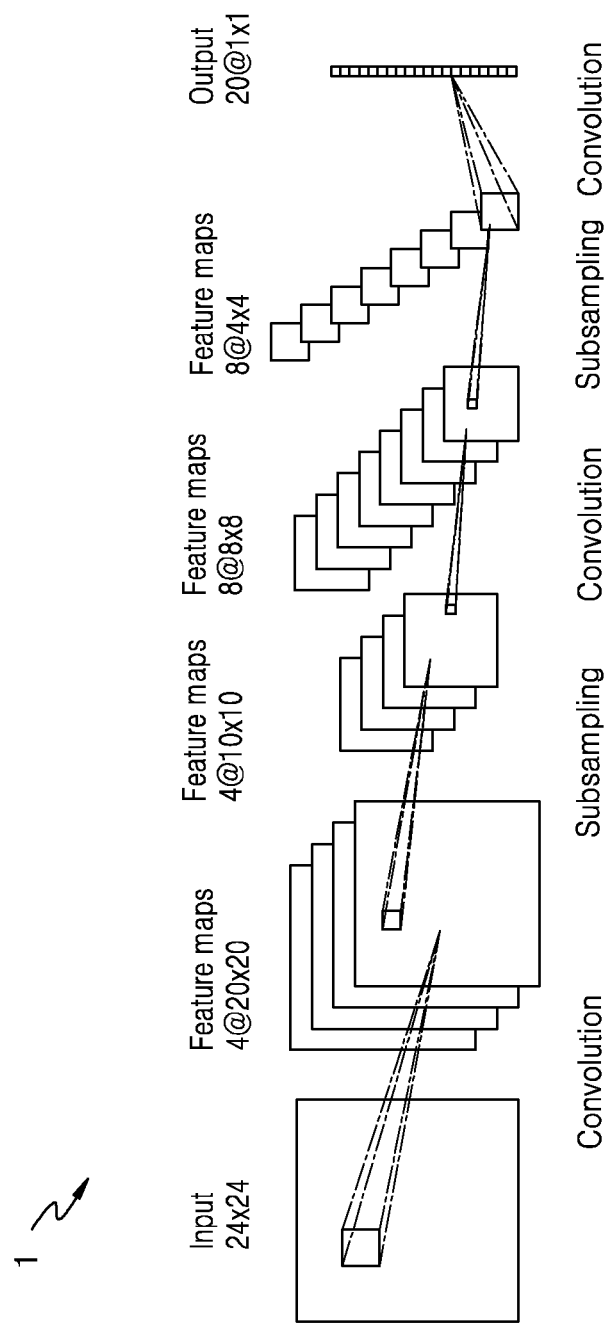
FIG. 1 is a diagram illustrating an example of a neural network architecture.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terms such as "comprise" or "include" should not be construed as necessarily including various elements or processes described in the specification, and it should be construed that some of the elements or the processes may not be included, or additional elements or processes may be further included.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. The expression "at least one of a, b or c" indicates only a, only b, only c, both a and b, both a and c, both b and c, all of a, b, and c, or variations thereof. The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example of a neural network architecture.

Referring to FIG. 1, a neural network 1 may be an architecture of a deep neural network (DNN) or an n-layer neural network. A DNN or an n-layer neural network may correspond to neural networks such as, for example, Convolutional Neural Networks (CNN), Recurrent Neural Networks (RNN), Deep Belief Networks (DBN), Restricted Boltzmann Machines, fully-connected network (FCN), a deep convolutional network (DCN), a long-short term memory (LSTM) network, and a grated recurrent units (GRUs). For example, the neural network 1 may be implemented as a CNN. Referring to FIG. 1, in the CNN corresponding to the neural network 1, may further include a subsampling layer (or pooling layer), and a fully connected layer, in addition to a convolution layer.

The neural network 1 may be implemented as an architecture having a plurality of layers including an input image, feature maps, and an output. In the neural network 1, a convolution operation between the input image and a weight map is conducted, and as a result, feature maps are output. A weight map refers to parameters used to detect features of an input image, and is also referred to as a kernel or a filter. A convolution operation is performed again between the output feature maps that are generated being used again as input feature maps and a weight map, and new feature maps are output. As a result of the convolution operation being performed repeatedly, a result of perception of features of an input image by using the neural network 1 may be finally output.

For example, when an image having a 24×24 pixel size is input to the neural network 1 of FIG. 1, the input image may undergo a convolution operation with a weight map and output as feature maps of four channels and in a 20×20 pixel size. In addition, only some pixel values of the feature maps of the four channels in a 20×20 pixel size may be used through subsampling operation, such as, for example, max-pooling and average-pooling, to output feature maps of four channels in a 10×10 pixel size.

In an example, the 10×10 feature maps may further repeatedly undergo a convolution operation with a weight map and a subsampling operation to be reduced in size, and global features may be ultimately output. In the neural network 1, the convolution operation and the subsampling operation (or pooling) may be repeatedly performed in various layers to filter and output, from the input image, strong features that may represent the entire image, and as the global features that are output are input to a fully connected layer, a perception result of the input image may be finally obtained.

In another example, the neural network may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be output through the neural network.

Figure 2:
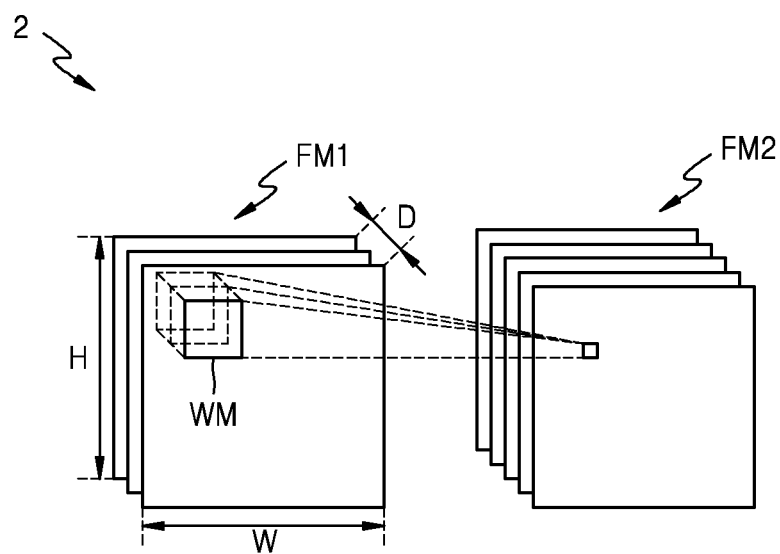
FIG. 2 is a diagram illustrating an example of a relationship between an input feature map and an output feature map in a neural network.

FIG. 2 illustrates an example of a relationship between an input feature map and an output feature map in a neural network.

Referring to FIG. 2, in an example, in a layer 2, which is any layer of a neural network, a first feature map FM1 may correspond to an input feature map, and a second feature map FM2 may correspond to an output feature map. A feature map may refer to a data set representing various features of input data. The first and second feature maps FM1 and FM2 may have elements of a two-dimensional (2D) matrix or elements of a three-dimensional (3D) matrix, and a pixel value may be defined for each element. The first and second feature maps FM1 and FM2 may have a width W (or referred to as a column), a height H (or referred to as a row), and a depth D. The depth D may correspond to the number of channels.

A convolution operation on the first feature map FM1 and a weight map WM may be conducted, and the second feature map FM2 may be generated as a result. A weight map refers to weight parameters respectively defined in each element. Features of the first feature map FM1 are filtered as a convolution operation is performed between the first feature map FM1 and the weight map. A convolution operation is performed between a weight map and windows (also referred to as tiles) of the first feature map FM1, while the first feature map FM1 shifts using a sliding window method. During each shift, each weight parameter included in the weight map may be multiplied by each pixel value of a window overlapped in the first feature map FM1 and the results of the multiplication may be added. As the first feature map FM1 and the weight map are convoluted, a channel of the second feature map FM2 may be generated.

While only one weight map is illustrated in FIG. 1, in an example, a plurality of weight maps may be respectively convoluted with the first feature map FM1 to generate the second feature map FM2 of a plurality of channels.

Meanwhile, the second feature map FM2 may correspond to an input feature map of a next layer. For example, the second feature map FM2 may be an input feature map of a pooling layer (or a subsampling layer).

In FIGS. 1 and 2, just a schematic architecture of the neural network 1 is illustrated for convenience of description. However, unlike the drawings, the neural network 1 may be implemented using more or less layers, feature maps, weight maps or the like than the illustrated ones, and sizes thereof may also be modified in various manners.

Figure 3:
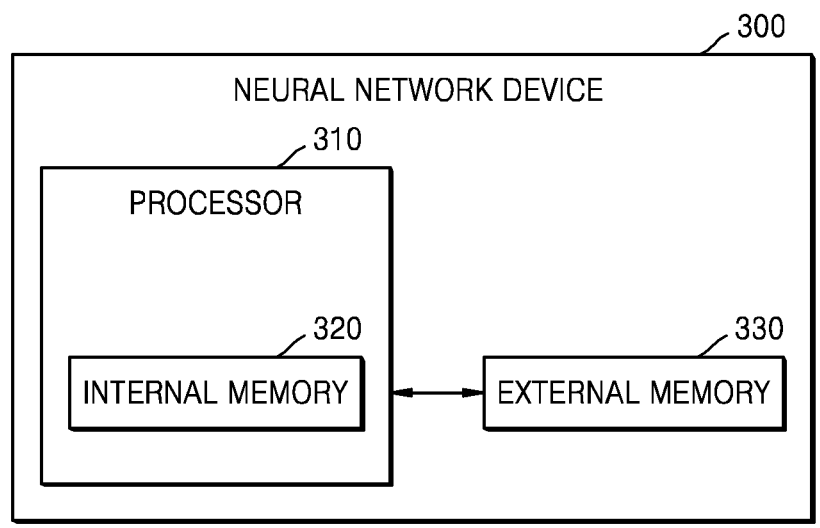
FIG. 3 is a diagram illustrating an example a neural network device.

FIG. 3 illustrates an example of a neural network device.

The neural network device 300 may be implemented as various kinds of devices, such as, for example, a server, a mobile device, a smart phone an embedded device, a wearable smart device (such as, a ring, a watch, a pair of glasses, glasses-type device, a bracelet, an ankle bracelet, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, voice authentication systems, an Augmented Reality (AR) device, various Internet of Things (IoT) devices, robotics, medical equipment, which perform voice recognition, image recognition, image classification, through a neural network, although not limited thereto. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling. The examples described herein may be used for road guidance information in a navigation device of a vehicle, such as, for example, an augmented reality head-up display (AR 3D HUD). Furthermore, the neural network device 300 may be a dedicated hardware accelerator mounted in the above-mentioned devices, and the neural network device 300 may be a hardware accelerator, such as, for example, a neural processing unit (NPU), a tensor processing unit (TPU), a neural engine, which is a dedicated module for driving a neural network, although not limited thereto. The examples described above are non-limiting, and other examples such as, for example, training, gaming, applications in healthcare, public safety, tourism, and marketing are considered to be well within the scope of the present disclosure. These devices perform one or more functions such as, for example, voice recognition, image recognition, and image classification.

Referring to FIG. 3, the neural network device 300 may include a processor 310, an internal memory 320, and an external memory 330. In addition to the elements illustrated in the neural network device 300 of FIG. 3, other general-use elements may be further included in the neural network device 300.

The processor 310 refers to a data processing device configured as hardware with a circuitry in a physical structure to execute desired operations. For example, the desired operations may include codes or instructions included in a program. For example, the processor 310 may be implemented as a microprocessor, a processor core, a multi-core processor, a multiprocessor, a central processing unit (CPU), a graphics processing unit (GPU), an application processor (AP), an application-specific integrated circuit (ASIC), and a field programmable gate array (FPGA) included in the neural network device 300, although not limited thereto. Also, the processor 310 may execute programs to control all operations of the neural network device 300. For example, the processor 310 may be implemented as a microprocessor (MCU) in which a CPU, a memory (Read Only Memory (ROM) or Radom Access Memory (RAM)), etc. are installed in a single chip, although not limited thereto. Further details regarding the processor 310 are provided below.

The external memory 330 refers to hardware storing various types of data processed in the neural network device 300 and may store, for example, data processed in the neural network device 300 or data to be processed in the neural network device 300. The external memory 330 may store applications, drivers, or the like to be driven by the neural network device 300. The external memory 330 may be memory such as, for example, random access memory (RAM) such as dynamic random access memory (DRAM), static random access memory (SRAM), or the like, read-only memory (ROM), electrically erasable programmable read-only memory (EEPROM), a CD-ROM, a Blu-ray or other optical disk storage, a hard disk drive (HDD), a solid state drive (SSD), and a flash memory. Further details regarding the memory 330 are provided below.

For example, the external memory 330 may store an output feature map which is a result of an intermediate operation in each layer of a neural network and weight maps that are not used in a current layer in which an operation is conducted. In an example, a neural network may perform giga-operation per second (GOPS) on each input image, use approximately hundred millions to hundred billions of weight maps, and generate hundreds of gigabyte intermediate operation results. Accordingly, when a frequency of access by the processor 310 to the external memory 330 increases, a considerable amount of a bandwidth of the external memory 330 may be consumed, which decrease an execution speed of the neural network device 300.

Thus, the neural network device 300 may further include the internal memory 320 in the processor 310 to enable faster access to data than when accessing the external memory 330. The internal memory 320 may be a cache memory of the processor 310 or SRAM, but is not limited thereto, and may include various forms of memory.

The processor 310 may efficiently allocate space of the internal memory 320 to minimize access to the external memory 330 in each of the layer.

In an example, the processor 310 may obtain, with respect to each of the layer, capacity information about a capacity of a space to store various types of data that are used or are generated in each layer. The processor 310 may obtain first capacity information indicating a capacity of a space to store an input feature map of a layer and second capacity information indicating a capacity of a space to store an output feature map of the layer. The first capacity information refers to a space needed to store an input feature map and may correspond to a size of input feature map data. Likewise, the second capacity information refers to a space needed to store an output feature map and may correspond to a size of output feature map data.

In an example, the processor 310 may allocate spaces to respectively store an input feature map and an output feature map of a layer in the internal memory 320 based on the capacity information. In an example, the processor 310 may allocate a first storage space to store an input feature map in the internal memory 320, based on an initial address value of the internal memory 320 and first capacity information, and allocate a second storage space to store an output feature map in the internal memory 320, based on a last address value of the internal memory 320 and second capacity information.

In an example, the first storage space may correspond to a space from the initial address value to a first address value of the internal memory 320, and the second storage space may correspond to a space from a second address value to a last address value of the internal memory 320. A first address value and a second address value may be each an arbitrary address value between an initial address value and a last address value of a memory. An output feature map of a current layer on a neural network is an input feature map of a next layer, and thus, by allocating spaces to store an input feature map and an output feature map of a layer at both ends of the internal memory 320, access to the external memory 330 is minimized.

Figure 4:
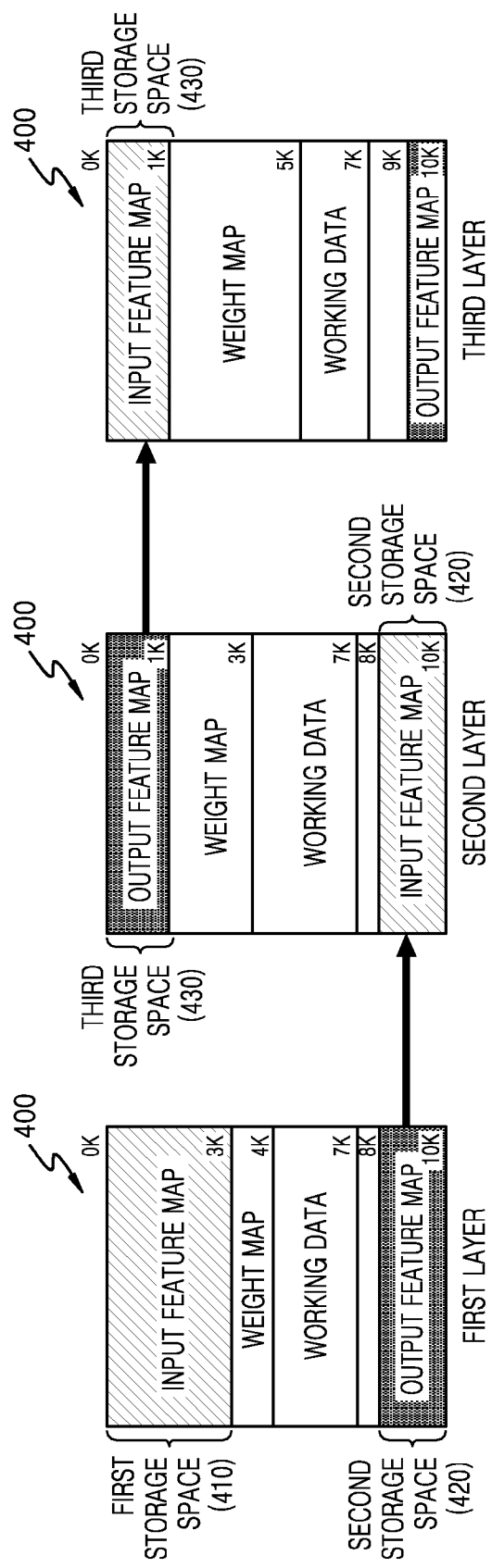
FIG. 4 is a diagram illustrating an example of a method of allocating a memory space.

FIG. 4 illustrates example of a method of allocating a memory space.

FIG. 4 illustrates an example of allocating a space of a memory 400 by the processor 310 in each of a first layer, a second layer, and a third layer of a neural network. In an example, the memory 400 of FIG. 4 corresponds to the internal memory 320 of FIG. 3.

The memory 400 may have a capacity of about 10K (bytes). In memory 400, data may be distinguished by numbering the data from 0 (0K) to 10000 (10K), and the numbers may be regarded as address values of the memory 400. That is, a position of a piece of data stored in a memory may be specified based on address values from a number 0K to a number 10K. The capacity of the memory 400 described above may be an example, and the memory 400 may have various capacities. The address values of the memory 400 are also not limited to the above-described ones, and may be expressed in various manners.

In an example, the processor 310 obtains first capacity information indicating a capacity of a space to store an input feature map of a first layer and second capacity information indicating a capacity of a space to store an output feature map of the first layer.

The first capacity information may be determined based on a width and height of an input feature map and the number of channels of the input feature map, and the second capacity information may also be determined based on a width and height of an output feature map and the number of channels of the output feature map. For example, the processor 310 may obtain information indicating that a capacity needed to store an input feature map of a first layer is 3K (bytes) and a capacity needed to store an output feature map of the first layer is 2K (bytes).

In an example, the processor 310 may allocate, in the memory 400, a first storage space 410 from a number 0K, which is an initial address value of the memory 400, to a number 3K, based on the capacity information indicating a capacity needed to store an input feature map of a first layer is 3K (bytes). In an example, the processor 310 may allocate, in the memory 400, a second storage space 420 from a number 8K of the memory 400 to a number 10K, which is a last address value of the memory 400, based on the capacity information indicating that a capacity needed to store an output feature map of the first layer is 2K (bytes).

In an example, the processor 310 may obtain fourth capacity information about a capacity of a space to store a weight map with which an operation is performed with an input feature map of the first layer. The fourth capacity information is a capacity of a space to store a weight map of the first layer and may be determined based on a size and the number of the weight map. The processor 310 may allocate a space to store the weight map between the first storage space 410 and the second storage space 420 based on the fourth capacity information. In an example, a space to store a weight map may be at least a portion of a space from a first address value to a second address value in a memory.

The processor 310 may allocate, in the memory 400, a space to store various types of data generated during a convolution operation process of a layer in addition to an input feature map, an output feature map, and a weight map, and these various types of data may be referred to as working data. For example, working data may include intermediate results of a convolution operation process.

According to the method in which the processor 310 has allocated the space of the memory 400 in the first layer, the input feature map and the weight map of the first layer may be stored in the memory 400. When the convolution operation between the input feature map and the weight map is completed, an output feature map of the first layer may be stored in the second storage space 420.

The processor 310 may allocate a space of the memory 400 with respect to the second layer following the first layer. The output feature map generated as a result of the convolution operation in the first layer may be an input feature map of the second layer. Accordingly, the processor 310 may allocate a space to store the input feature map of the second layer, to the second storage space 420, and may use the output feature map of the first layer stored in the second storage space 420 as an input feature map of the second layer without any change.

In addition, as in the first layer, the processor 310 may obtain third capacity information about a capacity of a space to store an output feature map of the second layer. The processor 310 may allocate a third storage space 430 to store an output feature map of the second layer in the memory 400 based on an initial address value and the third capacity information. For example, when a capacity needed to store an output feature map of a second layer is 1K (bytes), the processor 310 may allocate the third storage space 430 corresponding to a space from the number 0K, which is an initial address value of the memory 400, to the number 1K of the memory 400, in the memory 400.

Likewise, when allocating a space of the memory 400 with respect to a third layer, an output feature map of the second layer is an input feature map of the third layer. Thus, the processor 310 may allocate a space to store the input feature map of the third layer to the third storage space 430.

When spaces to store an input feature map and an output feature map of each layer are respectively allocated to both ends in the memory 400, memory fragmentation may be prevented, which will be described in more detail with reference to FIG. 5.

Figure 5:
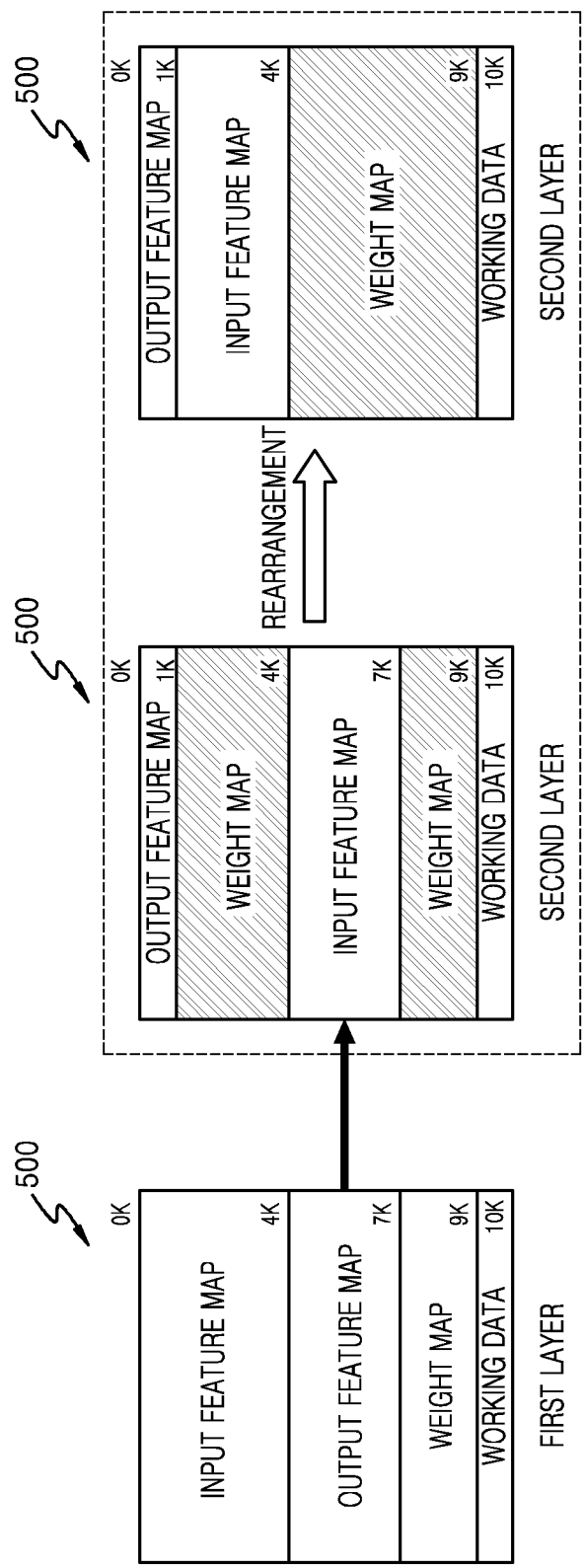
FIG. 5 is a diagram illustrating an example of a process in which overhead occurs due to memory fragmentation.

FIG. 5 illustrates an example of a process in which overhead occurs due to memory fragmentation.

FIG. 5 illustrates an embodiment of allocating a space of a memory 500 by the processor 310 in each of a first layer and a second layer of a neural network. The memory 500 of FIG. 5 may correspond to the internal memory 320 of FIG. 3.

The processor 310 may allocate a space from a number 4K to a number 7K of the memory 500 to store an output feature map of the first layer. When a convolution operation between an input feature map and a weight map in the first layer is completed, the output feature map of the first layer may be stored in the space from the number 4K to the number 7K of the memory 500.

In an example, the processor 310 may allocate a space of the memory 500 with respect to the second layer following the first layer. As the input feature map of the second layer is identical to the output feature map generated as a result of a convolution operation in the first layer, the output feature map of the first layer stored in the space from number 4K to number 7K of the memory 500 may be used as an input feature map of the second layer without any change.

In an example, the processor 310 may obtain capacity information regarding capacities of spaces to respectively store the output feature map, the weight map, and working data of the second layer. For example, the processor 310 may obtain capacity information indicating that capacities needed to respectively store an output feature map, a weight map, and working data are 1K (bytes), 5K (bytes), and 1K (bytes), respectively.

The processor 310 may allocate a space from a number 0K, which is an initial address value of the memory 500, to a number 1K thereof, to store the output feature map of the second layer. The processor 310 may allocate a space from a number 9K of the memory 500 to a last address value thereof, 10K, to store working data. While the space from number 1K to number 4K and the space from number 7K to number 9K in the memory 500 may be used, since a capacity of a space to store a weight map is 5K (bytes), allocation of the memory 500 is difficult, and this is referred to as memory fragmentation.

Thus, the processor 310 may have to conduct a process of combining fragmented spaces in the memory 500 that are distributed in the memory 500 and rearranging the same, and overhead may occur in this process.

Referring back to FIG. 4, spaces to store an input feature map and an output feature map of each layer are allocated to both ends in the memory 400. Accordingly, the memory fragmentation as illustrated in FIG. 5 does not occur, and thus overhead may also be prevented.

Figure 6:
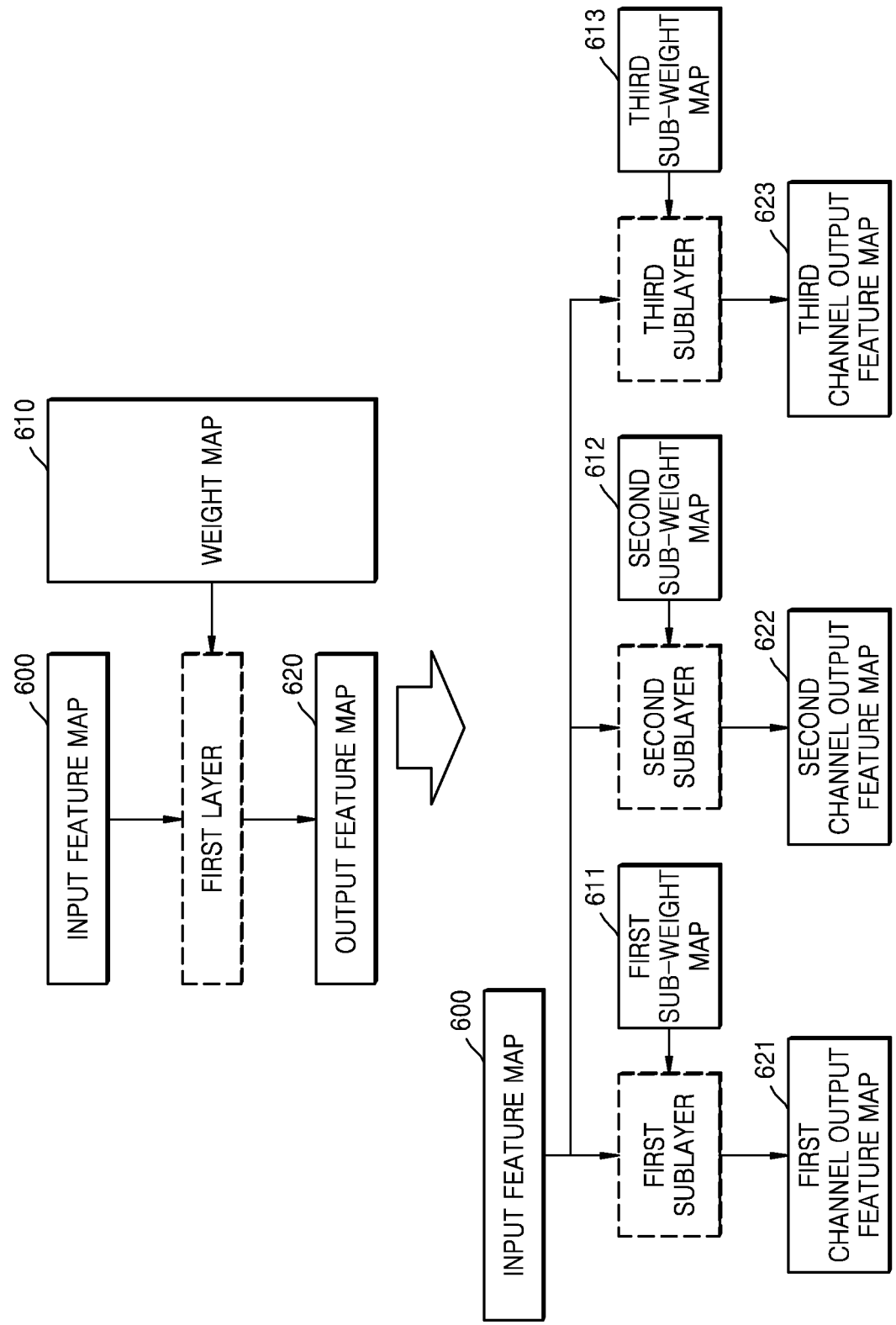
FIG. 6 is a diagram illustrating an example of dividing a layer into sublayers.

FIG. 6 illustrates an embodiment of dividing a layer into sublayers.

Referring to FIG. 6, the processor 310 may perform a convolution operation between an input feature map 600 of a first layer and a weight map 610 to generate an output feature map 620. However, a capacity of a space to store various types of data required for an operation in the first layer or data that is generated during the operation, such as the input feature map 600, the weight map 610, and the output feature map 620, may be greater than a size of a memory space in the processor 310. In this case, a frequency at which the processor 310 reads or writes data from or to an external memory increases, thus decreasing the execution speed.

Accordingly, the processor 310 may reduce access to an external memory by dividing the first layer into a first sublayer, a second sublayer, and a third sublayer and allocating a memory space to each of the first through third sublayers and performing an operation. For example, when a size of the weight map 610 is dominant, the processor 310 may perform a method of dividing a layer into sublayers.

The weight map 610 with which an operation is performed with the input feature map 600 of the first layer may also be divided into a plurality of sub-weight maps and allocated to each sublayer. The processor 310 may allocate a memory to each of the sublayers and perform an operation based thereon.

For example, a first sub-weight map 611 may be allocated to the first sublayer, and a convolution operation may be performed between the input feature map 600 and the first sub-weight map 611 in the first sublayer. Likewise, a second sub-weight map 612 may be allocated to the second sublayer, and a convolution operation may be performed between the input feature map 600 and the second sub-weight map 612 in the second sublayer, and a third sub-weight map 613 may be allocated to the third sublayer and a convolution operation between the input feature map 600 and the third sub-weight map 613 may be performed in the third sublayer.

As a result of an operation, the processor 310 may generate each of channels of the output feature map 620 with respect to each of the sublayers. In detail, an operation between each sub-weight map and each channel of an input feature map may be performed to calculate a sum product, and then a result of the calculation may be combined to form each of the channels of the output feature map 620.

For example, a first channel output feature map 621 may be generated by an operation between the input feature map 600 and the first sub-weight map 611 in the first sublayer, and a second channel output feature map 622 may be generated by an operation between the input feature map 600 and the second sub-weight map 612 in the second sublayer. Similarly, a third channel output feature map 623 may be generated by an operation between the input feature map 600 and the third sub-weight map 613 in the third sublayer. By summing up the first channel output feature map 621, the second channel output feature map 622, and the third channel output feature map 623, a same result as with the output feature map 620 may be obtained.

The number of sublayers and the number of sub-weight maps, etc. are not limited to those described above and may be varied without departing from the spirit and scope of the illustrative examples described.

Figure 7:
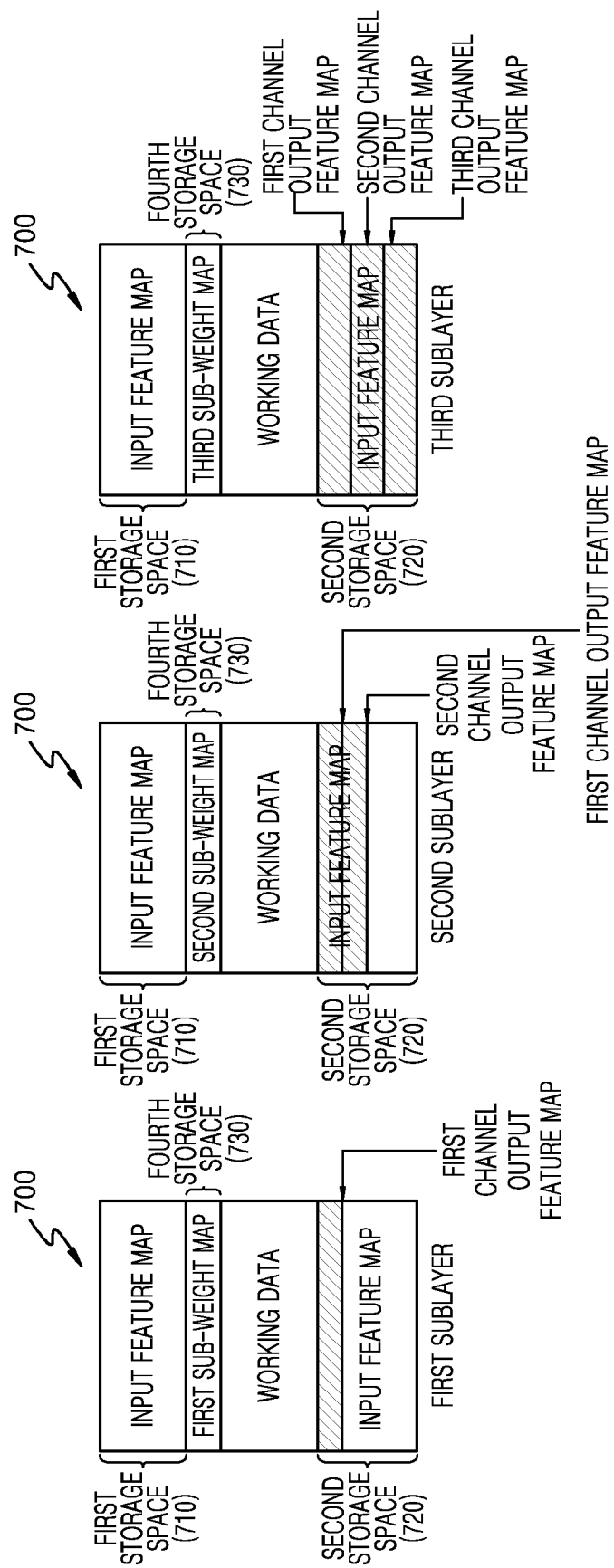
FIG. 7 is a diagram illustrating an example of dividing a layer into sublayers and allocating memory.

FIG. 7 illustrates an example of dividing a layer into sublayers and allocating memory to the sublayers.

Referring to FIG. 7, the processor 310 may allocate a space of a memory 700 to each of a first sublayer, a second sublayer, and a third sublayer. In an example, the memory 700 of FIG. 7 may correspond to the internal memory 320 of FIG. 3.

As described above with reference to FIG. 6, the processor 310 may divide the first layer into a plurality of sublayers, and when the memory 700 is allocated to each of the sublayers, the processor 310 may allocate a sub-weight map instead of a weight map of the first layer.

For example, when allocating the memory 700 to a first sublayer, the processor 310 may allocate, in the memory 700, a first storage space 710 to store an input feature map and a second storage space 720 to store an output feature map. In addition, the processor 310 may also allocate a fourth storage space 730 to store the first sub-weight map allocated to the first sublayer, between the first storage space 710 and the second storage space 720.

Likewise, even when allocating the memory 700 to each of the second sublayer and the third sublayer, a space to store an input feature map may be allocated to the first storage space 710, and a space to store output feature map may be allocated to the second storage space 720. In addition, in the second sublayer, a space to store a second sub-weight map may be allocated to the fourth storage space 730, and in the third sublayer, a space to store a third sub-weight map may be allocated to the fourth storage space 730.

Here, in each of the first sublayer, the second sublayer, and the third sublayer, a same input feature map may be stored in the first storage space 710. While moving from the first sublayer to the third sublayer, a sub-weight map allocated to each of the sublayers may be overwritten and stored in the fourth storage space 730.

In the second storage space 720, channels of an output feature map, which is a result of a convolution operation between the input feature map and the sub-weight map, may be sequentially stored. For example, in the first sublayer, a first channel output feature map may be stored in the second storage space 720, and in the second sublayer, a second channel output feature map may be accumulated in the first channel output feature map that is previously stored. Finally, when a third channel output feature map is accumulated in the third sublayer in the first channel output feature map and the second channel output feature map that are previously stored, generation of all channels of the output feature map is completed, and a convolution operation in the first layer may be terminated.

Figure 8:
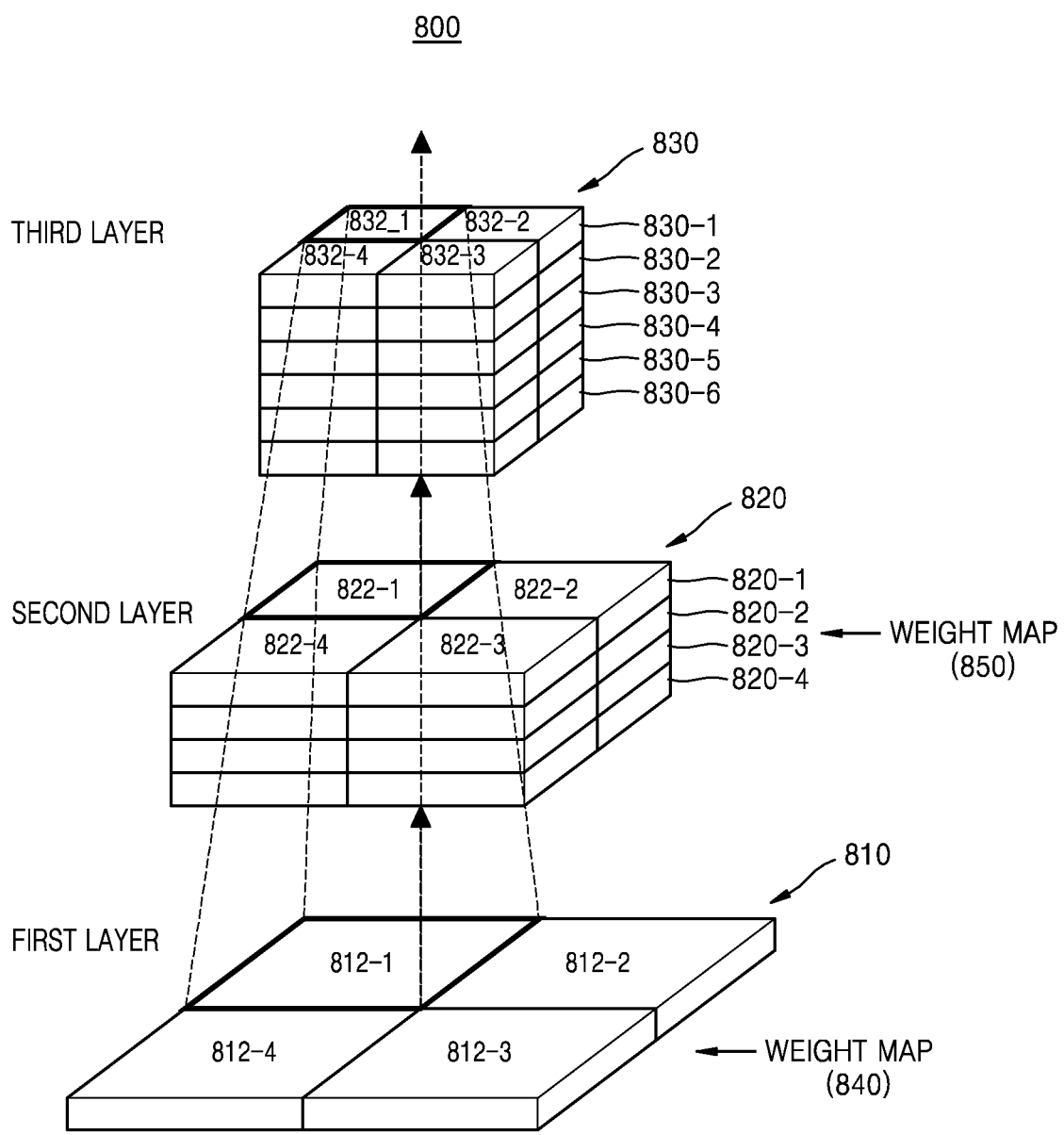
FIG. 8 is a diagram illustrating an example of grouping tiles in layers and allocating memory.

FIG. 8 illustrates an example of grouping tiles in a plurality of layers and allocating memory thereto.

A capacity of a space to store various types of data required for an operation in a layer in a neural network or generated during the operation, such as an input feature map, a weight map, and an output feature map, may be greater than a size of a memory space located in the processor 310. In addition, as described above with reference to FIGS. 6 and 7, when a memory is allocated by dividing a layer into sublayers, a capacity of a space to store various types of data may be greater than a size of a memory space located in the processor 310.

In an example, the processor 310 may tile certain layers to reduce access to an external memory by utilizing a memory capacity of an internal memory as much as possible. In an example, the processor 310 may group tiles in certain layers corresponding to input tiles and process them simultaneously. For example, when a size of an input feature map is dominant, the processor 310 may allocate a memory by grouping tiles in certain layers to perform an operation.

Referring to FIG. 8, an input feature map 810 of a first layer, an input feature map 820 of a second layer, and an output feature map 830 of the second layer are illustrated. The input feature map 820 of the second layer may include four channels 820-1, 820-2, 820-3, and 820-4, and the output feature map 830 of the second layer may include six channels 830-1, 830-2, 830-3, 830-4, 830-5, and 830-6. The number of channels of each of the input feature map 820 of the second layer and the output feature map 830 of the second layer respectively illustrated in FIG. 8 is not limited to the above, but may be varied without departing from the spirit and scope of the illustrative examples described.

First, the processor 310 may select an input tile 812-1 in the input feature map 810 of the first layer. The input tile 812-1 may correspond to a portion of the input feature map 810. A tile 822-1 may be generated by an operation between the input tile 812-1 and a weight map 840 in the first layer, and a tile 832-1 may be generated by an operation between the tile 822-1 and a weight map 850 in the second layer. The tile 822-1 may include portions of left upper ends of each of the channels 820-1, 820-2, 820-3, and 820-4 of the input feature map 820, and the tile 832-1 may include portions of left upper ends of each of the channels 830-1, 830-2, 830-3, 830-4, 830-5, and 830-6 of the output feature map 830.

When the processor 310 simultaneously processes tiles of the first layer and the second layer by grouping the tiles, the processor 310 may obtain capacity information about a capacity of a space to respectively store the input tile 812-1, the tiles 822-1, and the tiles 832-1, the weight map 840 of the first layer, the weight map 850 of the second layer, and other working data. When a sum of respective capacities obtained is equal to or less than a size of a capacity of a memory located in the processor 310, the processor 310 may allocate space to respectively store the input tile 812-1, the tile 822-1, the tile 832-1, the weight map 840 of the first layer, the weight map 850 of the second layer in a memory located in the processor 310 based on each piece of capacity information.

The processor 310 may perform operations in the first layer and the second layer corresponding to the input tile 812-1 at a time based on the allocated memory space. Likewise, the processor 310 may perform operations in the first layer and the second layer with respect to other input tiles 812-2, 812-3, and 812-4 at a time.

Sizes of input tiles and the number of certain layers to be grouped are not limited to the above-described one, and may be varied without departing from the spirit and scope of the illustrative examples described.

Figure 9:
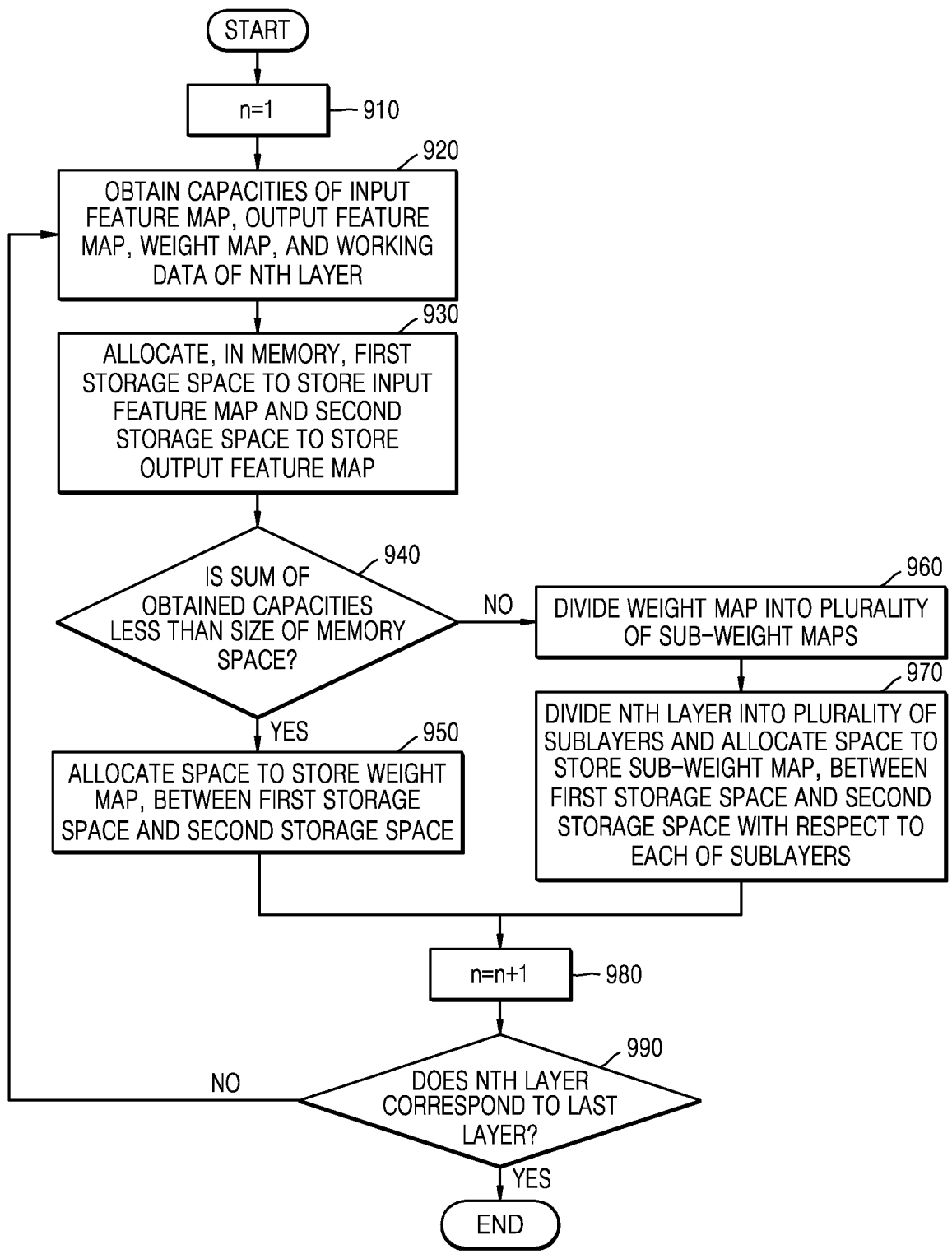
FIG. 9 is a diagram illustrating an example of a process of allocating memory space using a neural network device.

FIG. 9 is a diagram illustrating an example of a process of allocating memory space using a neural network device. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In an example, the operation of FIG. 9 may be performed by a neural network device (300 of FIG. 3). In addition to the description of FIG. 9 below, the descriptions of FIGS. 1-8 are also applicable to FIG. 9, and are incorporated herein by reference. Thus, the above description may not be repeated here.

In operation 910, the neural network device 300 may allocate a memory to an nth layer of a neural network. In an example, the neural network device 300 may allocate a memory to a first layer of the neural network. The memory may be located in the processor 310 of the neural network device 300.

In operation 920, the neural network device 300 may obtain capacities of an input feature map, an output feature map, a weight map, and working data of an nth layer.

In operation 930, the neural network device 300 may allocate, in the memory, a first storage space to store an input feature map and a second storage space to store an output feature map. The first storage space may correspond to a space from an initial address value to a first address value of a memory, and the second storage space may correspond to a space from a second address value to a last address value of the memory.

In operation 940, the neural network device 300 may determine whether a sum of the obtained capacities is less than a size of a memory space. When a sum of the capacities is less than the size of the memory space, the method proceeds to operation 950. When the sum of the capacities is not less than the size of the memory space, the method proceeds to operation 960. In an example, the neural network device 300 may sum up capacities of spaces for respectively storing an input feature map, an output feature map, a weight map, and working data of an nth layer, and determine whether a resultant value of the sum is less than the size of the memory space.

In operation 950, the neural network device 300 may allocate a space to store a weight map, between the first storage space and the second storage space.

In operation 960, the neural network device 300 may divide the weight map into a plurality of sub-weight maps. In an example, the neural network device 300 may divide the weight map into a plurality of sub-weight maps such that a plurality of channels of an output feature map are respectively generated from an operation between each of the sub-weight maps and the input feature map.

In operation 970, the neural network device 300 may divide an nth layer into a plurality of sublayers and may allocate a space to store a sub-weight map, between the first storage space and the second storage space with respect to each of the sublayers.

In operation 980, the neural network device 300 may allocate a memory to a next layer to the nth layer.

In operation 990, the neural network device 300 may determine whether the nth layer corresponds to a last layer. When the nth layer corresponds to a last layer, memory allocation is ended. Otherwise, when the nth layer does not correspond to a last layer, the method returns to operation 920. In other words, until memory is allocated to all layers, operations 920 through 980 may be repeated.

Figure 10:
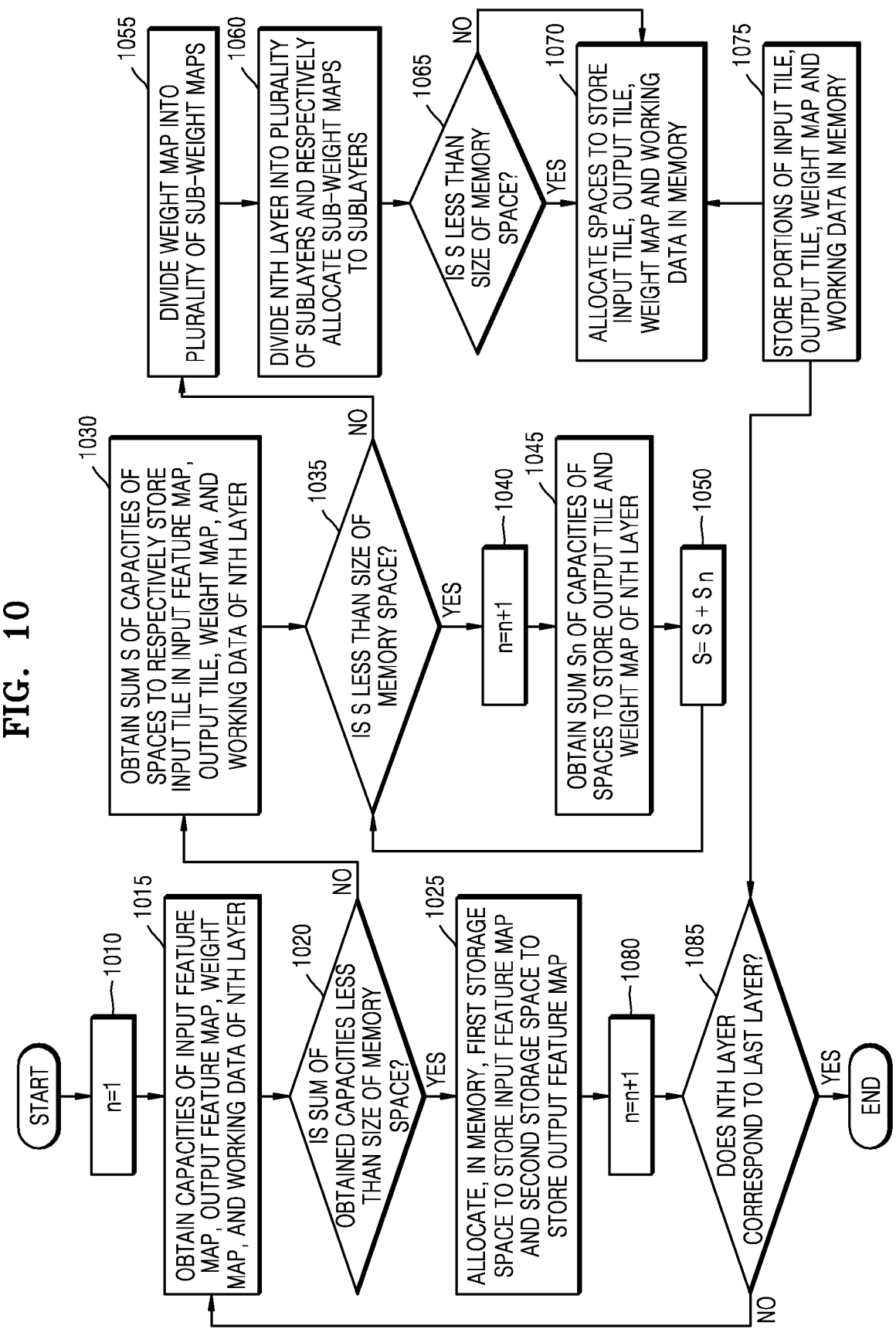
FIG. 10 is a diagram illustrating an example of a process of allocating memory space using a neural network device.

FIG. 10 is a diagram illustrating another example of a process of allocating memory space by using a neural network device. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In an example, the operation of FIG. 10 may be performed by a neural network device (300 of FIG. 3). In addition to the description of FIG. 10 below, the descriptions of FIGS. 1-9 are also applicable to FIG. 10, and are incorporated herein by reference. Thus, the above description may not be repeated here.

In operation 1010, the neural network device 300 may allocate a memory to an nth layer of a neural network. First, the neural network device 300 may allocate a memory to a first layer of the neural network. The memory may be located in the processor 310 of the neural network device 300. In operation 1015, the neural network device 300 may obtain capacities of an input feature map, an output feature map, a weight map, and working data of an nth layer.

In operation 1020, the neural network device 300 may determine whether a sum of the obtained capacities are less than a size of a memory space. When a sum of the capacities is less than the size of the memory space, the method proceeds to operation 1025. When the sum of the capacities is not less than the size of the memory space, the method proceeds to operation 1030. The neural network device 300 may sum up capacities of spaces for respectively storing an input feature map, an output feature map, a weight map, and working data of an nth layer, and determine whether a resultant value of the sum is less than the size of the memory space.

In operation 1025, the neural network device 300 may allocate, in the memory, a first storage space to store an input feature map and a second storage space to store an output feature map. The first storage space may correspond to a space from an initial address value to a first address value of the memory, and the second storage space may correspond to a space from a second address value to a last address value of the memory.

In operation 1030, the neural network device 300 may obtain a sum S of capacities of spaces to respectively store an input tile in an input feature map, an output tile, a weight map, and working data of an nth layer. An input tile may correspond to a portion of an input feature map, and an output tile may be generated by an operation between an input tile and a weight map in an nth layer.

In operation 1035, the neural network device 300 may determine whether the sum S is less than a size of a memory space. When the sum S is less than the size of the memory space, the method proceeds to operation 1040. When the sum S is not less than the size of the memory space, the method proceeds to operation 1055.

In operation 1040, the neural network device 300 may perform tiling on a next layer to the nth layer.

In operation 1045, the neural network device 300 may obtain a sum Sn of capacities of spaces to store an output tile and a weight map of the nth layer. Using the output tile of the nth layer as an input, the neural network device 300 may obtain a sum of capacities of a space to store an output tile generated by the output tile of the nth layer passing through a next layer to the nth layer and a space to store a weight map used in an operation of the next layer to the nth layer.

In operation 1050, the neural network device 300 may accumulate the sum S by adding the sum Sn to the sum S. The neural network device 300 may determine again whether the sum S that is accumulated is less than the size of the memory space. That is, operations 1035 through 1050 may be repeated until the sum S is not less than the size of the memory space.

In operation 1055, the neural network device 300 may divide a weight map into a plurality of sub-weight maps. The neural network device 300 may divide a weight map into a plurality of sub-weight maps such that a plurality of channels of an output feature map are respectively generated from an operation between each of the sub-weight maps and the input feature map.

In operation 1060, the neural network device 300 may divide an nth layer into a plurality of sublayers and may respectively allocate the sub-weight maps to the sublayers.

In operation 1065, the neural network device 300 may determine whether the sum S is less than the size of the memory space. When the sum S is less than the size of the memory space, the method proceeds to operation 1070. However, when the sum S is not less than the size of the memory space, the method proceeds to operation 1075.

In operation 1070, the neural network device 300 may allocate spaces to store an input tile, an output tile, a weight map and working data in a memory.

In operation 1075, the neural network device 300 may store portions of an input tile, an output tile, a weight map and working data in an external memory. That is, as the sum S is greater than the size of the memory space, the processor 310 reads or writes data from or to the external memory during operation.

In operation 1080, the neural network device 300 may allocate a memory to a next layer to nth layer.

In operation 1085, the neural network device 300 may determine whether the nth layer corresponds to a last layer. When the nth layer corresponds to a last layer, memory allocation is ended. When the nth layer does not correspond to a last layer, the method returns to operation 1015. In other words, until memory is allocated to all layers, operations 1015 through 1080 may be repeated.

Figure 11:
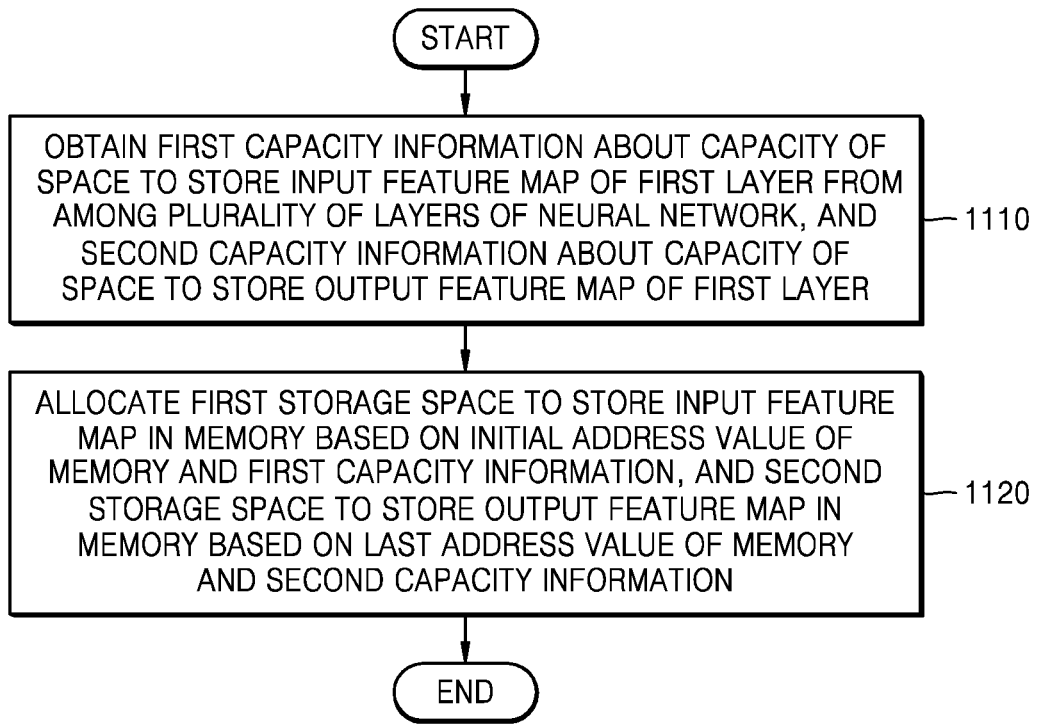
FIG. 11 is a is a diagram illustrating an example of a process of allocating, in a memory, space for storing an input feature map and an output feature map in each layer of a neural network.

FIG. 11 is a diagram illustrating an example of a process of allocating, in a memory, space for storing an input feature map and an output feature map in each layer of a neural network. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer, such as a processor, that perform the specified functions, or combinations of special purpose hardware and computer instructions. In an example, the operation of FIG. 11 may be performed by a neural network device (300 of FIG. 3). In addition to the description of FIG. 11 below, the descriptions of FIGS. 1-10 are also applicable to FIG. 11, and are incorporated herein by reference. Thus, the above description may not be repeated here.

In operation 1110, the neural network device 300 may obtain first capacity information about a capacity of a space to store an input feature map of a first layer from among a plurality of layers of the neural network device 300, and second capacity information about a capacity of a space to store an output feature map of the first layer. The first capacity information refers to a space needed to store an input feature map of the first layer, and may correspond to a size of input feature map data. Likewise, the second capacity information refers to a space needed to store an output feature map of the first layer, and may correspond to a size of output feature map data.

In operation 1120, the neural network device 300 may allocate a first storage space to store an input feature map in the memory based on an initial address value of the memory and the first capacity information, and a second storage space to store an output feature map in the memory based on a last address value of the memory and the second capacity information. The first storage space may correspond to a space from the initial address value to a first address value of the memory, and the second storage space may correspond to a space from a second address value to the last address value of the memory. The first address value and the second address value may be each an arbitrary address value between the initial address value and the last address value of the memory. The neural network device 300 may minimize access to an external memory by respectively allocating spaces for storing an input feature map and an output feature map of a layer to both ends of the memory.

A method and apparatus for allocating memory space for driving a neural network may be provided, where an internal memory space located in a processor may be allocated to each of a plurality of layers of a neural network. In an example, spaces for storing an input feature map and an output feature map of a layer may be allocated to both ends of the internal memory space. An output feature map of a current layer is an input feature map of a next layer, and thus, when spaces to store the input feature map and the output feature map are respectively allocated to both ends of the internal memory space, access to an external memory may be reduced. Accordingly, degradation in performance of a neural network due to limited bandwidths of an external memory may be minimized.

The apparatus 300 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of allocating a memory to layers of a neural network, the method comprising:
   obtaining first capacity information of a space to store an input feature map of a first layer from among the layers of the neural network, and second capacity information of a space to store an output feature map of the first layer; and
   allocating a first storage space to store the input feature map in a space of the memory including an initial address value of the memory based on the first capacity information and a second storage space to store the output feature map in a space of the memory including a last address value of the memory based on the second capacity information,
   wherein the space including the initial address value and the space including the last address value respectively correspond to both ends of the memory.

2. The method of claim 1, further comprising:
   allocating a space to store an input feature map of a second layer subsequent to the first layer, to the second storage space;
   obtaining third capacity information of a space to store an output feature map of the second layer; and
   allocating a third storage space to store the output feature map of the second layer in a space of the memory including the initial address value of the memory based on the third capacity information.

3. The method of claim 1, wherein:
   the obtaining further comprises obtaining fourth capacity information of a space to store a weight map for an operation with the input feature map, and
   the allocating further comprises allocating a space to store the weight map between the first storage space and the second storage space based on the fourth capacity information.

4. The method of claim 1, further comprising:
   dividing a weight map of the first layer into sub-weight maps;
   dividing the first layer into sublayers and respectively allocating the sub-weight maps to the sublayers;
   obtaining sub-capacity information of spaces to respectively store the sub-weight maps; and
   allocating, to each of the sublayers, a space to store a sub-weight map of the sub-weight maps based on the respective sub-capacity information of the sub-weight map, between the first storage space and the second storage space.

5. The method of claim 4, wherein channels of the output feature map are respectively generated from an operation between each of the sub-weight maps and the input feature map, and
   sequentially storing the channels of the output feature map in the second storage space.

6. The method of claim 1, further comprising:
   selecting an input tile in the input feature map of the first layer;
   obtaining capacity information about a capacity to respectively store the input tile, an output tile corresponding to the input tile, and a weight map of the first layer; and
   allocating spaces to respectively store the input tile, the output tile, and the weight map in the memory based on the capacity information.

7. The method of claim 1, wherein the memory is located in a processor of a device driving the neural network.

8. A non-transitory computer-readable storage medium storing instructions that, when executed by a processor, cause the processor to perform the method of claim 1.

9. A device comprising:
   a processor configured to drive to execute instructions to drive a neural network to:
   obtain first capacity information of a space to store an input feature map of a first layer from among layers of the neural network, and second capacity information of a space to store an output feature map of the first layer, and
   allocate a first storage space to store the input feature map in a space of a memory including an initial address value of the memory based on the first capacity information and a second storage space to store the output feature map in a space of the memory including a last address value of the memory based on the second capacity information,
   wherein the space including the initial address value and the space including the last address value respectively correspond to both ends of the memory.

10. The device of claim 9, wherein the processor is further configured to:
    allocate a space to store an input feature map of a second layer subsequent to the first layer, to the second storage space;
    obtain third capacity information of a space to store an output feature map of the second layer; and allocate a third storage space to store the output feature map of the second layer in a space of the memory including the initial address value of the memory based on the third capacity information.

11. The device of claim 9, wherein the processor is further configured to:

obtain fourth capacity information of a space to store a weight map for an operation with the input feature map; and allocate a space to store the weight map between the first storage space and the second storage space based on the fourth capacity information.

12. The device of claim 9, wherein the processor is further configured to:

divide a weight map of the first layer into sub-weight maps, divide the first layer into sublayers, and respectively allocate the sub-weight maps to the sublayers;

obtain sub-capacity information of spaces to respectively store the sub-weight maps; and allocate, to each of the sublayers, a space to store a sub-weight map of the sub-weight maps based on the respective sub-capacity information of the sub-weight map, between the first storage space and the second storage space.

13. The device of claim 12, wherein the processor is further configured to:

generate channels of the output feature map from an operation between each of the sub-weight maps and the input feature map; and sequentially store each of the channels of the output feature map.

14. The device of claim 9, wherein the processor is further configured to:

select an input tile in the input feature map of the first layer;

obtain capacity information about a capacity to respectively store the input tile, an output tile corresponding to the input tile, and the weight map of the first layer; and allocate spaces to respectively store the input tile, the output tile, and the weight map in the memory based on the capacity information.

15. The device of claim 9, wherein the memory is located in the processor.

* * * * *